(12) United States Patent
Luo et al.

(10) Patent No.: US 7,458,158 B2
(45) Date of Patent: Dec. 2, 2008

(54) METHOD OF MAKING A SLIDING BEARING

(75) Inventors: Yuefeng Luo, Ann Arbor, MI (US); Paul Freemantle, Plymouth, MI (US); William Zdeblick, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 465 days.

(21) Appl. No.: 11/169,032

(22) Filed: Jun. 28, 2005

(65) Prior Publication Data

US 2006/0288579 A1    Dec. 28, 2006

(51) Int. Cl.
  *B21D 53/10* (2006.01)
  *B21B 1/46* (2006.01)
  *F16C 32/06* (2006.01)
  *F16C 33/10* (2006.01)
  *F16C 33/00* (2006.01)
  *F16C 33/02* (2006.01)
  *F16C 1/24* (2006.01)

(52) U.S. Cl. ............ 29/898; 29/898.12; 29/898.14; 29/527.1; 384/12; 384/42; 384/118; 384/123; 384/285; 384/291; 384/293; 384/379

(58) Field of Classification Search ............ 29/898, 29/898.12–898.14, 527.1; 384/282–286, 384/293, 12–13, 42, 118, 123, 291, 379
See application file for complete search history.

(56) References Cited

U.S. PATENT DOCUMENTS

| 174,331 | A | 2/1876 | White |
| 259,255 | A | 6/1882 | Williams |
| 1,194,463 | A | 8/1916 | Bache |
| 1,581,394 | A | 4/1926 | Dann |
| 2,431,430 | A * | 11/1947 | Shaw ............... 384/285 |
| 3,436,129 | A | 4/1969 | James |
| 3,785,711 | A | 1/1974 | Bliemeister |
| 5,462,362 | A | 10/1995 | Yuhta et al. |
| 5,664,890 | A | 9/1997 | Nowak et al. |
| 6,240,641 | B1 * | 6/2001 | Toyota et al. ............ 29/898.03 |
| 2004/0008914 | A1 * | 1/2004 | Hiramatsu et al. ........ 384/276 |
| 2005/0069448 | A1 * | 3/2005 | Sato et al. ............... 419/8 |

FOREIGN PATENT DOCUMENTS

JP        05126138 A        5/1993

\* cited by examiner

*Primary Examiner*—David P Bryant
*Assistant Examiner*—Alexander P. Taousakis
(74) *Attorney, Agent, or Firm*—Robert L Stearns; Dickinson Wright PLLC

(57) ABSTRACT

This invention introduces a new category of engineered surfaces and corresponding production processes for better wear resistance and lower friction loss. The structured surfaces can be applied on many automobile components with frictional surfaces. The composite structure settles the usual conflicts between surface functions and stresses. Two sets of multiple-step processes are introduced to achieve high production efficiency and low cost. Unlike traditional surface technologies that generate single and uniform layers on the whole part surface, the new technology processes the part surface selectively for more effective surfaces with versatile functions.

25 Claims, 7 Drawing Sheets

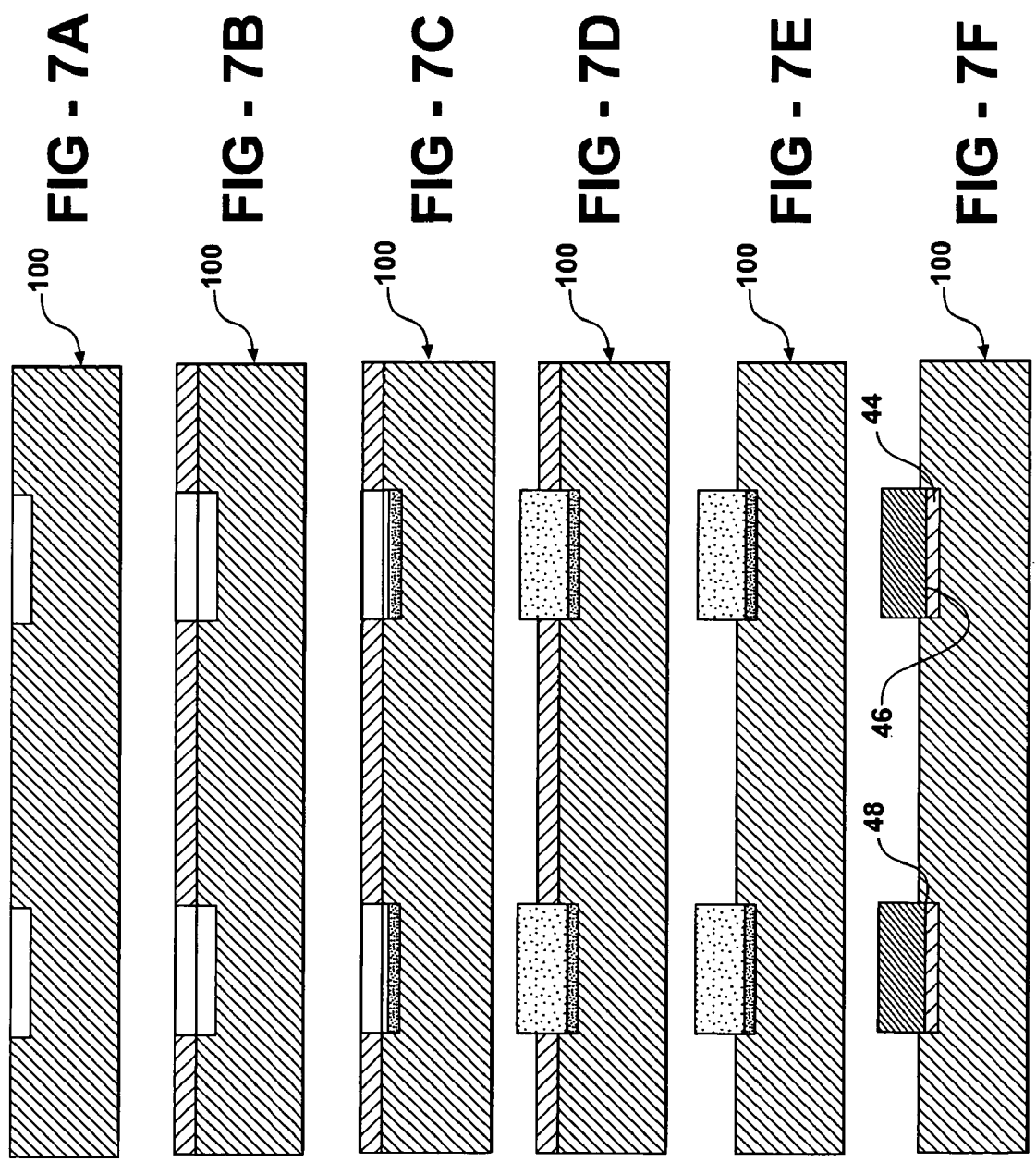

METHOD OF MAKING A SLIDING BEARING

BACKGROUND OF THE INVENTION

1. Technical Field

This invention relates generally to a method modifying a bearing surface of a sliding bearing member. More particularly, it relates to a method of adding at least one surface feature as a coating to a wear surface by selective deposition of the coating in the shape of the feature on the bearing surface.

2. Related Art

A bearing is defined in a general sense as a means of positioning one member with respect to another member in such a way that relative motion of the members is possible. The members have respective bearing surfaces which are in bearing contact with one another, typically through a lubricant which is used to promote the relative movement of the members, reduce wear of the bearing surfaces, reducing corrosion and for other purposes. The relative motion of the bearing surfaces and the bearing type are dictated by the requirements of the application of which the bearing surfaces will be a part. Bearings and bearing surfaces are designed by determining the mechanical motion and functions which they must perform, and the application requirements for life and reliability and the ambient conditions, including temperature, potential contaminants, the potential for corrosion, vibration, cyclic stresses and others.

Of particular interest are sliding bearings, in which the bearing surfaces of the bearing elements are usually separated by a thin film of coating of a lubricant such as various types of oils and greases. Sliding bearings encompass a broad range of devices in which the relative movement of the bearing elements involves sliding movement of one bearing surface over the other bearing surface. Such devices include all types of journal or sleeve bearings which are used to position a shaft or movable part in a radial direction, as well as all types of thrust bearings which are used in general to prevent movement of a rotating shaft in an axial direction and as guides for linear motion of various types. Thrust bearings vary widely in design as well, ranging from simple, flat thrust collars to complex tapered-end and pivoted-shoe (i.e., Kingsbury) bearings. Some journal and thrust bearings are designed to operate with a lubricant supply under sufficient external pressure so that the load is carried by through the pressurized fluid rather than by the hydrodynamic forces generated by the sliding motion. Other bearings move slowly enough, or intermittently, or under sufficiently light loads so that separation by a film of lubricant is not necessary for satisfactory performance and life. In this case, the surfaces are allowed to rub on each other with only the boundary-lubrication properties of the lubricant, which may comprise one or both of the bearing surfaces, or the surface properties of the bearing surfaces themselves, preventing seizure and wear. Another broad category of sliding bearing and bearing surfaces include many reciprocating piston/cylinder applications, such as the bearing comprising the drive piston/cylinder of an internal combustion engine.

Various materials are used for sliding bearings, and in particular, the bearing surfaces, including metals such as various cast iron alloys, steel alloys, aluminum alloys, copper alloys and many other metals, engineering plastics of various types, including both thermoplastic and thermoset materials, various glass or ceramic materials, wood and many other materials. Lubricants come in many forms and compositions, from various fluids, including water, oil, soaps, greases and air, to solid lubricants such as graphite, molybdenum disulfide, polytetrafluoroethylene (PTFE) and others.

Among the mechanical requirements to be considered in choosing a bearing are the load to be carried and the character of the load, the surface velocity which can be tolerated by the bearing, the ability of the bearing to tolerate misalignment, the friction when starting the bearing under a load, the power consumption of the bearing, the space requirement, the type of failure that may occur, the damping capacity, and the lubrication requirements. Factors associated with each of these mechanical requirements are well-known.

There are also typically economic and environmental requirements to be considered in the selection of bearings. In this respect, the principal economic factors are life and reliability, maintenance, ease of replacement and cost. Sliding bearings, when properly designed and when operating under reasonably uniform loading with compatible material, may have excellent longevity. As to cost, sliding bearings can frequently be produced at very small cost in mass-production quantities, but their cost can be very large, when they have to be produced in small quantities for special designs. Thus, methods of making such bearings will preferably have a minimum number of required steps and be well adapted for automation and/or high volume manufacturing methods.

As indicated above, journal bearings are one type of sliding bearing. Journal bearings are classified roughly according to the method of lubricant feed to them, as (a) non-pressurized bearings, (b) pressure-fed bearings, or (c) externally pressurized bearings. Examples of non-pressurized bearing are bushings, wick-oil bearings and oil ring bearings. Pressure-fed bearings have lubricant (i.e., oil) which is fed under pressure. A pressure-fed bearing system may include a storage tank, a pump, either a full flow or bypass-type filter or centrifuge, a cooler, a pressure regulator, a temperature regulator, supply lines to the bearings, and return lines from the bearings (which drain the lubricant from the bearings back to the tank). Examples of pressure-fed bearings include circumferential-groove, cylindrical, cylindrical overshoot, pressure, multiple groove, elliptical, elliptical overshoot, three-low, pivoted-shoe, nutcracker and partial sliding bearings. Externally pressurized bearings, such as pocket bearings and hydrostatic bearings, depend upon lubricant (i.e., oil) pressure from an external pressure source to support the bearing load. This differs from hydrodynamic bearings, which depend upon lubricant pressures generated in the lubricant film to support the load.

As indicated above, thrust bearings are a second general type of sliding bearing. The types of thrust bearings include low-speed bearings, which largely depend upon boundary lubrication, types which operate on hydrodynamic principals and externally pressurized thrust bearings. These include flat-land thrust bearings, tapered-land thrust bearings, pivoted-shoe thrust bearings or Kingsbury bearings, spring-supported flexible-plate thrust bearings, step thrust bearings and pocket thrust bearings.

Another form of a sliding bearing and associated bearing surfaces include any of a number of piston and associated cylinder liner. These include reciprocating pistons used in numerous internal combustion engines and many other applications. Reciprocating pistons and their associated cylinder housings typically require continuous lubrication of the bearing surfaces, including both the piston and cylinder sidewalls. In the associated linkages to a drive mechanism, such as a crankshaft, they also utilize still other sliding bearings, such as a wristpin and associated pin bores (i.e., a rotatable cylindrical pin in a pin bore). The wristpin is also connected to a bore in a connecting rod using a similar bearing arrangement.

The connecting rod is in turn connected to the crankshaft through a sleeve bearing. These surface features are also applied to the surface of piston rings for dynamic sealing and lubrication. The piston rings are coupled with the cylinder liner. The surface patterns on the piston surface strengthen the function of piston rings; they may reduce or even eliminate the rings for low cost. All of the elements of the piston/cylinder bearing and bearings associated with the linkage require lubrication, and friction and wear properties are some of the principal design requirements.

Yet another sliding bearing arrangement is a ball and socket connection, such as is described in U.S. 462,362 to Yuhta et al. A ball having a semi-spherical bearing surface or a other curved bearing surface, is used with a mating socket having a mating bearing surface. Applications for such bearings include artificial hip joints.

Many different materials can be utilized for sliding bearings depending on the bearing type and the application and application environment. They may be made of conductive or non-conductive materials; examples of conductive materials include most metals and metal alloys, such as various iron alloys (i.e., numerous cast iron and steel compositions), copper alloys and aluminum alloys, and various composites which contain a metal or other conductive material. Non-conductive materials may include various engineering plastics, such as nylon, polytetrafluoroethylene (PTFE), ceramics, molded-fabric, wood and many other non-conductive materials. The conductive materials may be formed by numerous metalworking methods, including casting, sintering, forging and other known methods, and will frequently employ machining, grinding, polishing and other well-known finishing operations to produce the finished bearing shape and surface finish.

For all applications of these sliding bearing types, friction loss and wear are two major challenges for the bearings and bearing surfaces. This is particularly the case in harsh application environments, such as is the case with the many types of sliding bearings used in automotive vehicle applications, such as those that are subjected to reciprocal or sliding motion in engines, as well as other friction/wear systems and other motion systems. Smooth and hard surfaces are typically preferred for low wear and friction to a certain extent. However, a phenomenon frequently described as surface stiction can occur if the contacting surfaces are too smooth and the bearing surface contact area is too large. Stiction is the combination of static and friction, and it represents a physical property which must be overcome by a force in order to put an object at rest into motion. Furthermore, hard materials are frequently not suitable for use as bearing materials because they generally have low fracture toughness. The use of various hard coatings for bearing surfaces have been proposed, but they are also known to be prone to failure under high surface stress conditions due to low fracture toughness or problems associated with the adhesion of the bearing surface coating to the underlying bearing material.

The use of various raised features or projections on the bearing surface in the form of a plurality of rectangular lands, cylindrical dots and other forms have been proposed, such as those described in U.S. Pat. No. 174,331 to White, U.S. Pat. No. 259,255 to Williams, U.S. Pat. No. 1,581,394 to Dann et al., U.S. Pat. No. 3,436,129 to James, U.S. Pat. No. 5,462,362 Yuhta et al. and others. Various materials have been proposed for the raised features or projections depending on the bearing materials used, ranging from buck-horn to asbestos to PTFE to ceramics; including titanium nitride, diamond, alumina, sapphire, silicon nitride, silicon carbide, zirconia, silica and titania, to metals, such as tin, lead, zinc, cadmium and alloys of such metals. These materials have been applied by various methods to the bearing surface, ranging from the insertion of distinct plugs or studs into suitably shaped holes in the bearing surface to form the raised feature to the deposition of thin films of the raised portion materials.

However, these methods have typically been specific to a particular combination of bearing material and material used to form the raised feature or projection. Further, they frequently have required extensive preparation of the bearing surface, as by drilling, forming or otherwise preparing the bearing surface to receive the raised projection, or manual or other restrictive methods of applying the raised projections to the bearing surface. The conventional processes can only fabricate macro features on the bearing parts. The process is not sufficiently flexible and efficient for many surface designs, which require thin layers and complex surface patterns. The conventional method also put too much surface materials on the part and reduces the performance of substrate because the surface materials does not perform as good as the substrate materials.

Therefore, there remains a need for improved methods of making bearings and bearing surfaces which facilitate the application of a wide range of materials for use as raised features or projections to a wide range of bearing surface materials having a wide range of bearing surface shapes, particularly methods which c an be used to form a plurality of raised features in a single step or series of steps, and more particularly methods which may be performed using automated equipment.

SUMMARY OF THE INVENTION

The proposed surface structures will settle the dilemma imposed by the convention of continuous uniform surface. Separate surface elements with different materials are so designed as to satisfy conflicting surface requirements. The proposed surface structure with relative thin/pattered layers and different materials from the substrate materials will settle the dilemma; thus, the engineered surfaces can give better performance to retain lubricants, pumping lubricant, and resist wear without compromising the performance and cost of the bearing substrate. Unlike the surface, the bearing substrate needs to have sufficient structural strength instead of wear resistance and lubricant enhancement. The materials conflict can be satisfied by the composite surface.

Advanced materials processing technologies are necessary to realize these surfaces. These processes include electro-chemical, electro-plasma, and photo-dielectric lithography, etc. Optimal combination of several processes is organized to achieve the best production efficiency and lowest cost. Advanced materials processing technologies are necessary to realize these surfaces. These processes include electrochemical, electrophoretic, electro-plasma, electrostatic, and photo-dielectric lithography, etc. The combination of several processes is optimized to achieve the best production efficiency and lowest cost.

BRIEF DESCRIPTION OF THE DRAWINGS

These and other features and advantages of the present invention will become more readily appreciated when considered in connection with the following detailed description and appended drawings, wherein:

FIGS. 7A-7F is a schematic illustration of the steps of a third embodiment of the method of the present invention;

DETAILED DESCRIPTION OF THE PREFERRED EMBODIMENT

The present invention is a method of making a sliding bearing having a bearing surface which includes at least one of bearing surface feature which is located in and extends upwardly from a corresponding plurality of cavities formed in the bearing surface. The at least one bearing surface feature is preferably made from a bearing surface material and formed in a predetermined pattern so as to improve at least one of the friction and wear characteristics of the bearing surface, and consequently of the bearing also.

Figure 1:
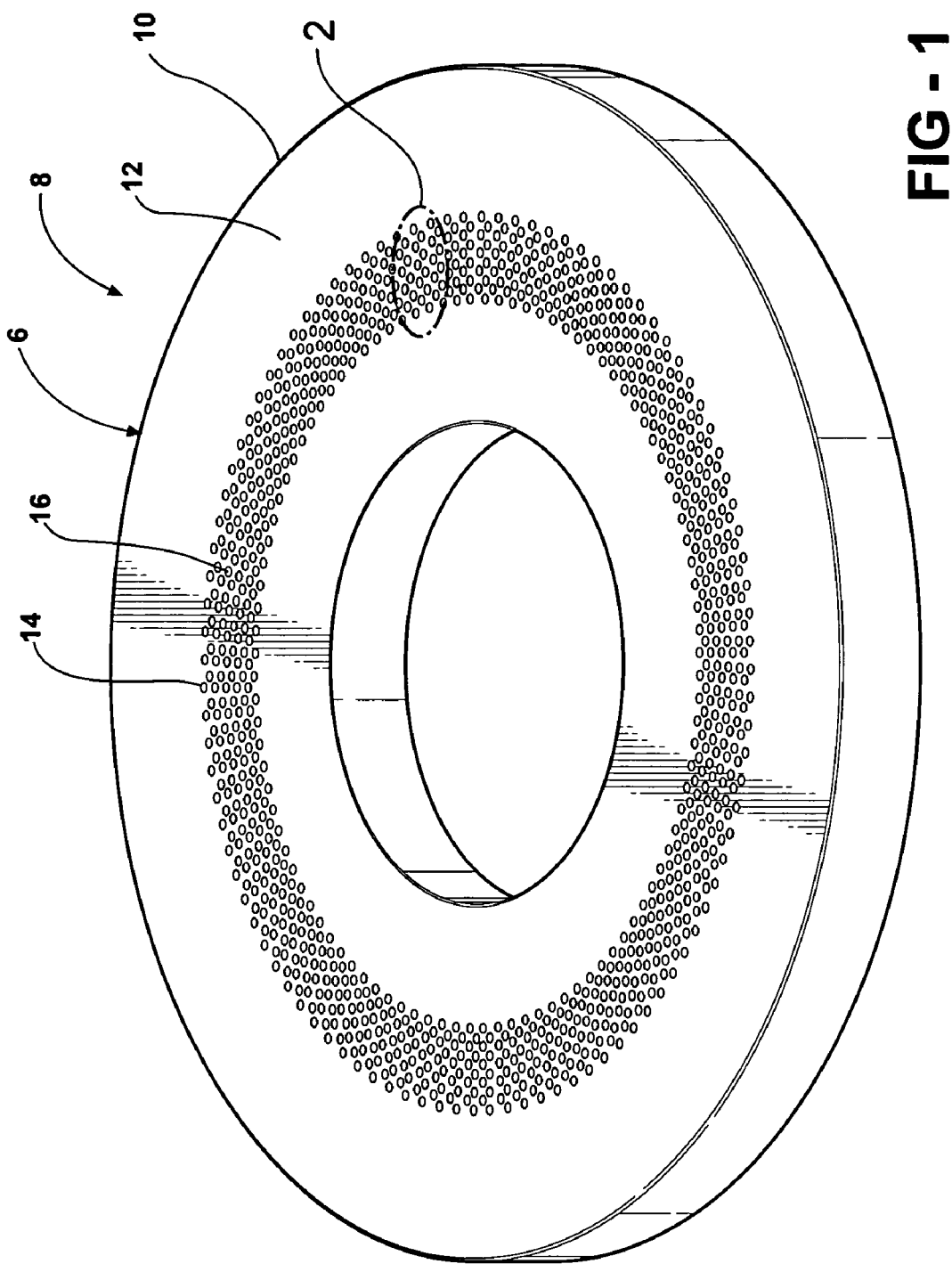
FIG. 1 is a perspective view of an embodiment of a thrust washer made in accordance with the method of the present invention.
Figure 2:
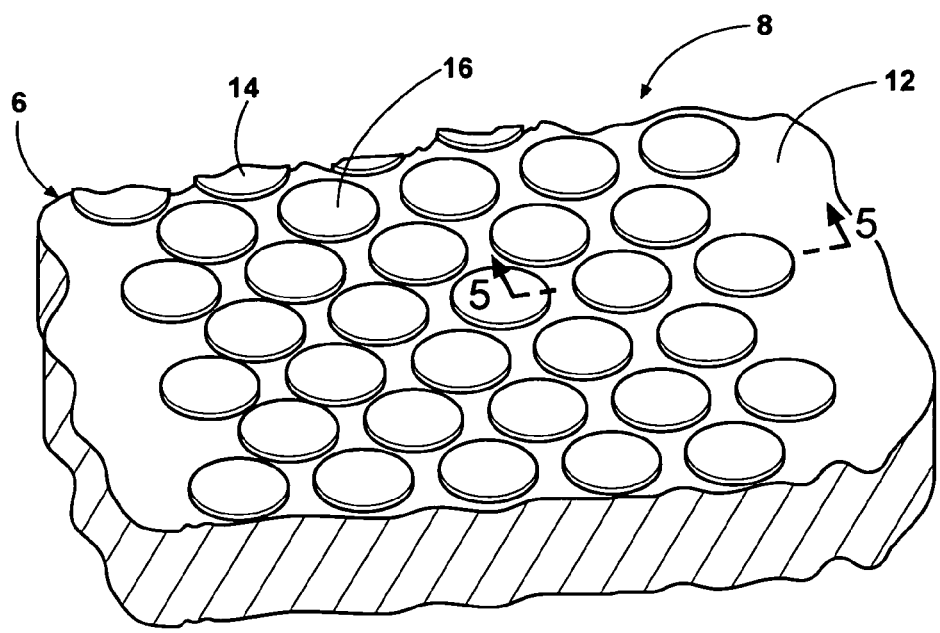
FIG. 2 is an enlarged view of a portion of FIG. 1.
Figure 3:
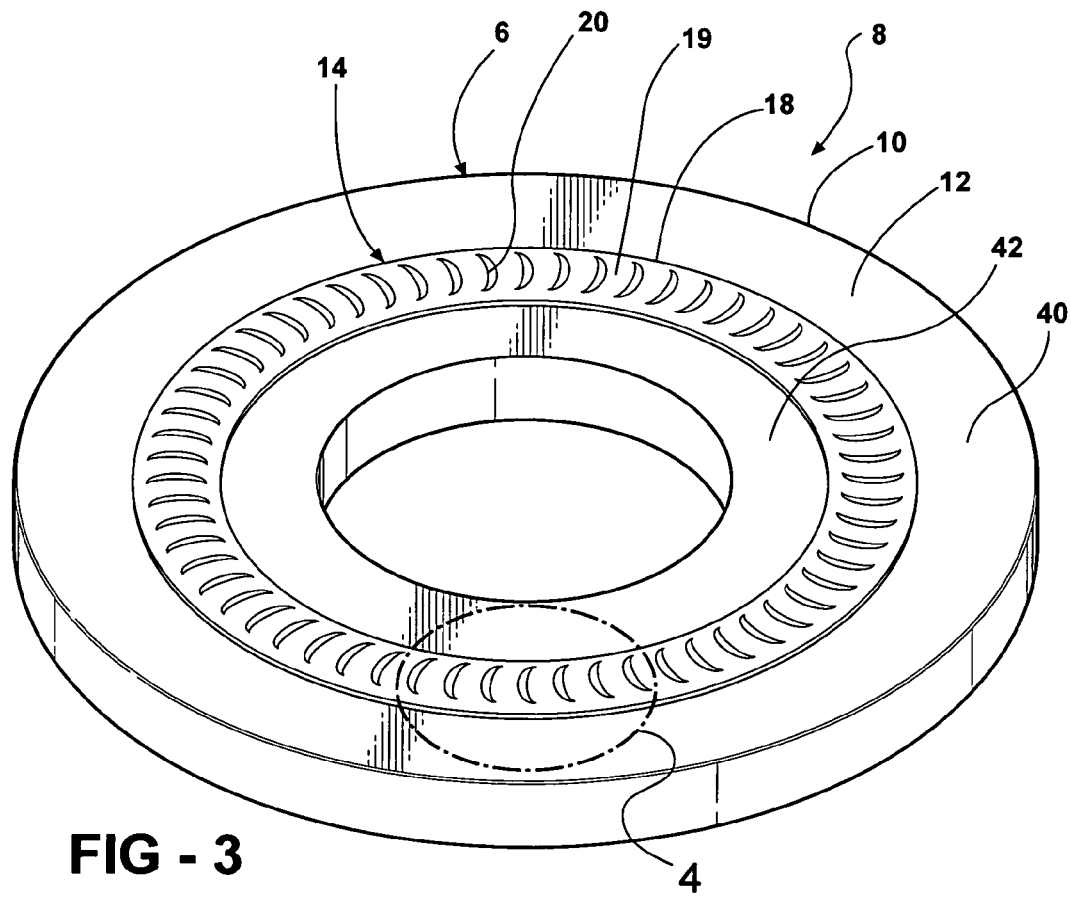
FIG. 3 is a perspective view of a second embodiment of a thrust washer made in accordance with the method of the present invention.
Figure 4:
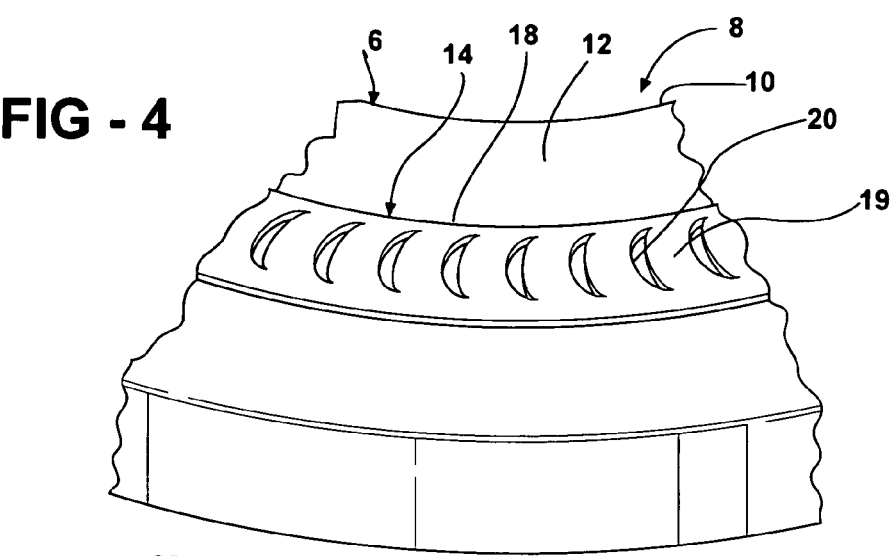
FIG. 4 is an enlarged view of a portion of FIG. 3.
Figure 8:
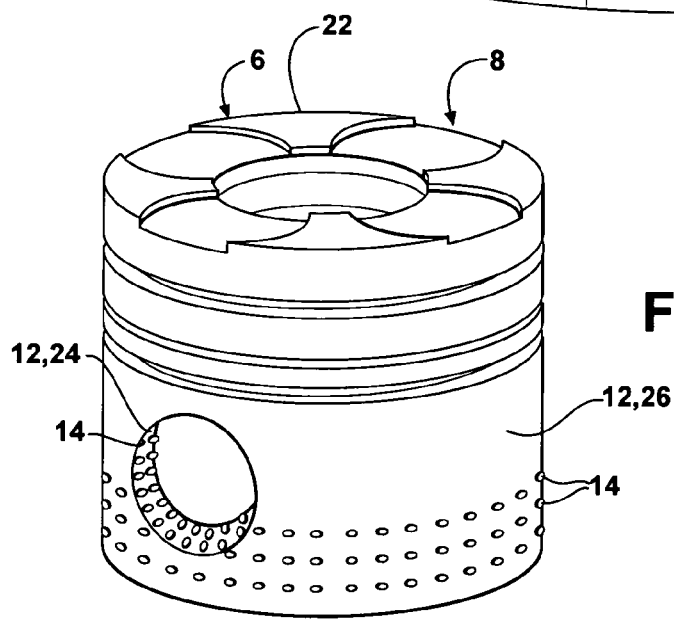
FIG. 8 is a perspective view of a piston having a bearing surface made in accordance with a method of the present invention.
Figure 9:
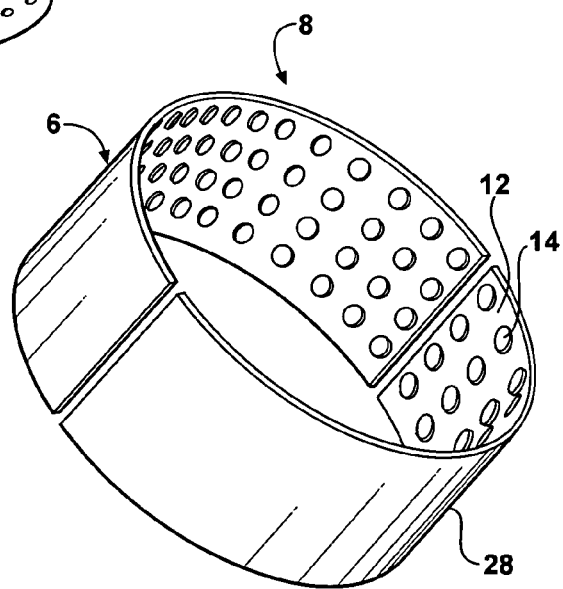
FIG. 9 is a perspective view of a sleeve bearing having a bearing surface made in accordance with the method of the present invention.
Figure 11:
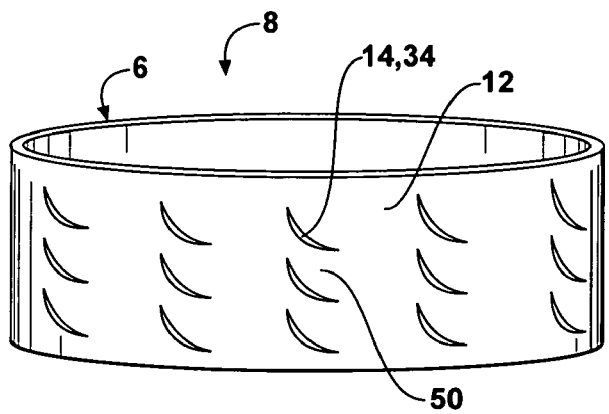
FIG. 11 is a schematic illustration of a cylinder having a bearing surface made in accordance with the method of the present invention.

FIGS. 1-2 and FIGS. 3-4 illustrate two examples, respectively, of a bearing having at least one bearing surface feature which may be made by the method of the present invention. FIGS. 1-2 illustrate one example of bearing element 6 of a sliding bearing 8 in the form of a thrust washer 10 having a bearing surface 12 which includes a plurality of bearing surface features 14 in the form of cylindrical pads 16. These features 14 are located within a plurality of correspondingly shaped cavities 17 (best shown in FIG. 5) or recesses located on bearing surface 12 and which together comprise a portion of bearing surface 12. The use of the term bearing surface feature 14 is intended to connote the wide variety of shapes and patterns that may be utilized, as well as the wide variety of sizes of the same. Bearing surface features 14 preferably extend upwardly from and terminate above bearing surface 12, as illustrated in FIG. 5E. FIGS. 3-4 illustrate a second example of a thrust washer 10 having a bearing surface 12 which includes a bearing surface feature 14 in the form of a ring 18 having a plurality of arcuate ring segments grooves 20 spaced circumferentially about the ring 18. These bearing surface features 14 are preferably selected to promote the retention of, or direct the flow of, a lubricant (not shown) used in conjunction with the operation of the bearing 8. While these examples illustrate two exemplary embodiments of bearing surface features 14 which may be made in accordance with the method of the present invention, any suitable pattern or shape of bearing surface features 14 may be formed on bearing surface 12, depending on the intended application of the bearing 8. Further, the method of the invention may be applied to a bearing surface 12 of any of the elements 6 of any of a number of types of sliding bearings 8, as illustrated generally in FIGS. 7-10. For example, FIG. 8 illustrates incorporation of the bearing surface features 14 on several of the bearing surfaces 12 of a piston 22, such as the pin bore 24 and the skirt face 26. FIG. 9 illustrates the incorporation of the bearing surface features 14 on several of the bearing surfaces 12 of a sleeve bearing 28 as might be used for a crankshaft. FIG. 9 illustrates another embodiment of bearing surface features 14 on a bearing surface 12, such as the crown or skirt of a piston, in the form of a grid of spaced apart rectangular pads 30. It is believed that the spaces 32 between the pads will assist to retain oil in them during the operation of piston. FIG. 11 illustrates another embodiment of bearing surface features 14 on a bearing surface 12, such as the crown or skirt of a piston, in the form of a grid of spaced apart arcuate pads 34. It is believed that arcuate pads 34 may provide a hydrodynamic pumping action on a lubricant such as oil during the reciprocation of piston 29. In addition, if the cylinder shown were used in a rotating application, it is believed that a hydrodynamic pumping action on a lubricant, such as oil, would result in conjunction with the rotation of the cylinder. Many other types of bearing surface features 14 may be added to bearing surface 12 depending on the type of bearing 8 being considered and the desired wear, friction and lubrication requirements of the bearing surface 12 and other factors.

The bearing surface features 14 basically consist of dense pads or patterns that are embedded into the bearing surface 12 (or surfaces) of the bearing 8 that are subject to frictional contact and wear. The bearing 8, including bearing surface 12, and bearing surface features 14 can be made from different materials. FIGS. 1 and 2 illustrate one example of bearing surface features 14. The bearing surface features 14 may comprise a hard layer which is relatively harder than the material of the bearing surface 12 to provide enhanced wear resistance. For many of the metals commonly used as bearings, including iron-alloys, copper-alloys and aluminum-alloys, examples of hard materials for use as bearing surface features 14 include materials such as chrome and many ceramic materials, including metal oxides, nitrides and carbides. Rather than being hard materials, the bearing surface features 14 can provide wear resistance by acting to reduce the coefficient of friction of the bearing surface 12 taken as a whole. In this instance, bearing surface features 14 should comprise a lubricious material as a solid lubricant, for example, PTFE, graphite, polyimide, molybdenum disulfide or other well-known solid lubricants.

In some embodiments of bearings 8 made by the method of the invention, spaces 50 and 32 between the bearing surface features 14 isolate intrinsic stresses within the material used to form the feature, which may result from the deposition method employed to deposit the material of bearing surface feature 14 or from a mismatch between the coefficients of thermal expansion of the feature and the bearing surface 12 and also provide oil retention for lubrication of the bearing surface 12.

FIGS. 3 and 4 show another example of bearing surface features 14 which may be made in accordance with the method of the invention. In addition to the use of the bearing surface features 14 for the functions described above, the space between the pads can be formed as pumping grooves for dynamic sealing and lubrication. The details of their shape and design will depend on the bearing function and geometry and may include a variety of forms and derivatives. Multi-layer coatings and structures may be utilized as bearing surface features 14. This includes multi-layer structures which may not be possible to use as a friction reducing or wear resistant coating layer over the entire bearing surface 12 due to intrinsic stresses within such a coating that can exceed the adhesion strength of the coating layer.

In order to reduce the surface tensile stresses when hard but relatively brittle surface coatings used for making surface bearing features 14, the surface bearing features 14 are separated into discrete pads as shown in FIGS. 1 and 2. These pads may be made from hard coating materials, such as ceramic and chrome and are very resistant to compression and wear loads. The substrate or bearing surface 12 may be made from less hard but tougher materials, such as low carbon steel and aluminum, and takes the tensile and thermal stresses as a structural support. In this configuration, the wear resistance of the bearing surface 12 is increased while at the same time reducing the likelihood of the separation of the hard coating. In general, the smaller and denser the bearing surface features are, the stronger the bearing surface 12, and the less likelihood of separation of the bearing surface feature 14 caused by intrinsic stresses in the coating layer. In this way, overall part performance including wear resistance, fracture toughness, and adhesion strength are improved, generally with lower materials cost.

In order to reduce the surface tensile stress when relatively less strong and softer materials are used for making surface bearing features 14, the surface bearing feature 14 is separated into discrete pads as shown in FIGS. 1 and 2. These pads may be made from lubricious materials, such as PTFE, which acts as a solid lubricant and enables reduction of friction with little surface oil. The substrate or bearing surface 12 may be made from materials, such as low carbon steel and aluminum, to take the tensile and thermal stresses as a structural support member. In this configuration, the friction loss is reduced without the conflict of surface weakening. In general, the smaller and denser the pads are, the stronger the surface and the less likelihood of separation of the bearing surface feature 14 caused by intrinsic stresses in the coating layer. Overall part performance including friction loss, fracture toughness, and structure strength are improved with lower material and processing cost.

As described herein, small cavities will be formed into the bearing surface 12 and the bearing surface feature 14 materials are deposited into the cavities. Thus, these pads will have a foundation built into the bearing surface 12 to increase the bonding strength. This structural arrangement reduces the requirement for the surface adhesion between the bearing surface 12 material and the bearing surface feature 14 material. The pads or features will sit firmly in place. This arrangement is more important when using some material combinations than others, including those which utilize PTFE, because the adhesion strength of PTFE to many metal surfaces is known to be relatively low.

Thus there are two roles of the spaces 50 and 32 between the bearing surface features 14. One role is to isolate the surface stresses when hard coating material are employed as previously mentioned. In addition, the spaces which separate the features such as shown in FIGS. 1 and 2 can play a role as a retention means for lubricant. A local lubricant reservoir on the bearing surface is very desirable for extremely low and very high motion speeds of the bearing surfaces to prevent oil starvation and wear processes which result from such starvation.

As is also shown in FIGS. 3 and 4, the space between the supporting pads can be formed so as to function as a plurality of hydrodynamic pumping grooves 20 for dynamic lubrication or sealing by providing bearing surface feature 14 in the form of ring 18 having grooves 20 which are preferably raised slightly above bearing surface 12. During the relative rotational motion between bearing surface 12, including bearing surface feature 14, and a mating bearing surface (not shown) which is in load bearing contact with the bearing surface 12, a lubricant (not shown) such as an oil is provided to the outer portion 40 of bearing surface 12. The lubricant is subject to a hydrodynamic pumping action through grooves 20 in response to the relative rotation of bearing surface 12 and the mating bearing surface. The lubricant is driven into the inner portion 42 of bearing surface 12 through these grooves 20.

The method of the invention may also be adapted to provide an adhesion promoter 44 or an adhesion layer between the portion of the bearing surface 12 within the plurality of cavities 17 and the lower surface 46 of the bearing surface feature 14. The adhesion promoter 44 may be formed of any material which increases the adhesion strength of the bearing surface feature 14 to the portion of the bearing surface 12 at the interface 48 between them as compared to the strength of this interface when the adhesion promoter 44 is not present. The material used for adhesion promoter 44 will depend upon the materials selected for bearing surface 12 and bearing surface feature 14. In the case where these are metals or ceramics, well-known adhesion promoters such as a thin layer of chromium or titanium may be applied using known deposition methods. In the case where bearing surface 12 is a metal and bearing surface feature 14 is an engineering plastic such as PTFE, polyimide, or a non-metal or mineral, such as graphite or asbestos, the adhesion promoter 44 may comprise any of a number of well-known organic or other adhesives for bonding these materials to the metal bearing surface 12.

As described above, bearing surface features 14 made according to the method of the present invention are multifunctional. They may form various combinations of low friction coefficient, tough, and strong bearing contacts. In the case where bearing surface features 14 project above bearing surface 12, the spaces 50 of bearing surface 12 not taken up by bearing surface features 14 act as recesses on bearing surface 12 which provide for lubricant retention and hydrodynamic pumping as well as providing spacing between adjacent features which serves as a means of limiting or isolating the intrinsic stresses associated with the bearing surface features 14. The bearing surface features 14 effectively resist the wear bearing surface 12, by at least one of providing a harder wear surface or providing a wear surface that has a reduced coefficient of friction over that of the bearing surface 12. The bearing surface 12 and bearing 8 take the normal, shear and thermal loads, the cavities 17 in the bearing surface 12 serve to retain the bearing surface features 14.

Referring now to FIGS. 5A-5D, the present invention includes a method 100 of making a sliding bearing 8. In one embodiment, method 100 includes the steps of: fabricating 200 a bearing member 8 of a first material having a bearing surface 12; forming 300 a plurality of cavities 17 in the bearing surface such that a portion of the bearing surface 12 corresponds to the cavities 17; depositing 400 a layer of a fluid polymer 54 over the bearing surface such that the layer of the fluid polymer covers substantially all of the bearing surface 12 except for the portion of the bearing surface 12 corresponding to the plurality of cavities 17; and depositing 500 a second material 56 into the cavities 17 to form a corresponding plurality of bearing surface features 4 in the cavities 17.

Figure 5A:
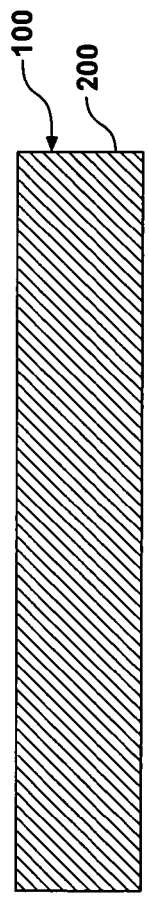
FIGS. 5A-5E is a schematic illustration of the steps of one embodiment of the method of the present invention.
Figure 5B:
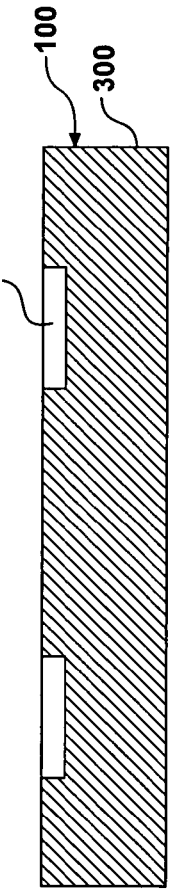
Figure 5C:
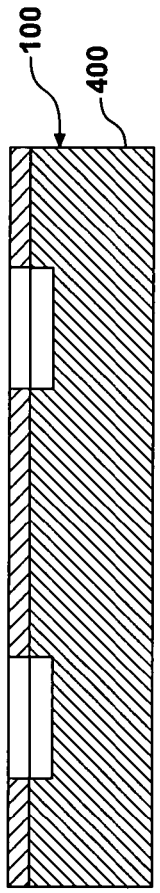
Figure 5D:
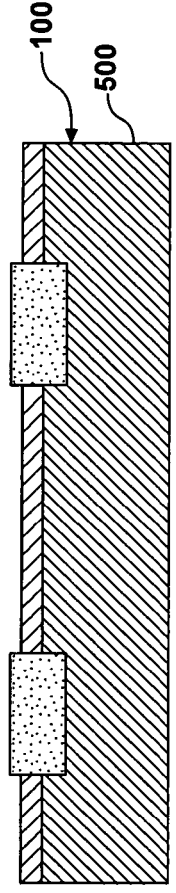
Figure 5E:
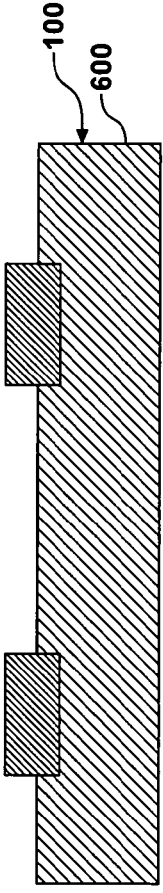
Figure 6A:
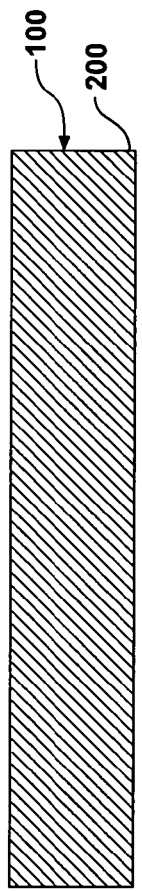
FIGS. 6A-6F is a schematic illustration of the steps of a second embodiment of the method of the present invention.
Figure 6B:
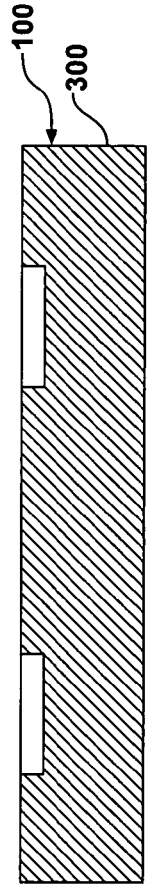
Figure 6C:
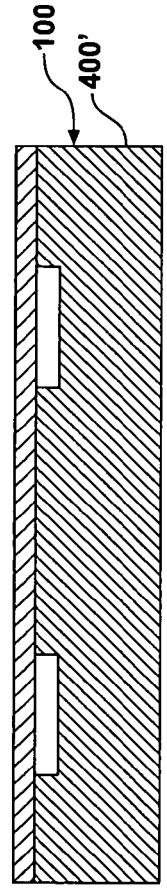
Figure 6D:
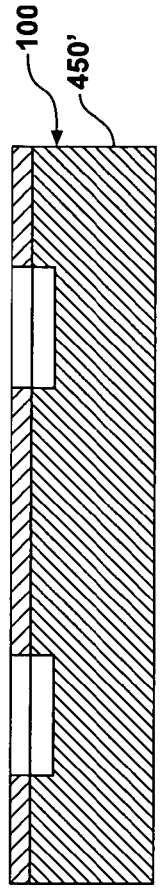
Figure 6E:
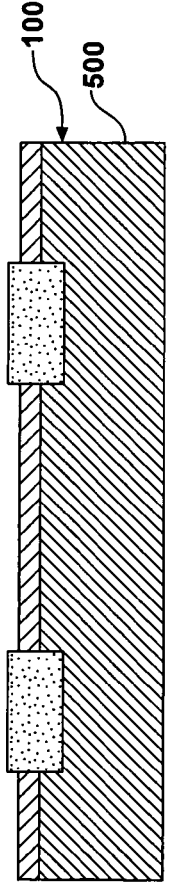
Figure 6F:
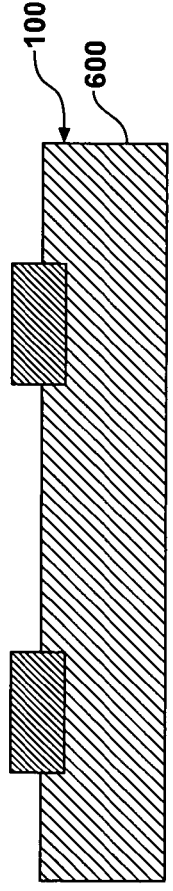
Figure 10:
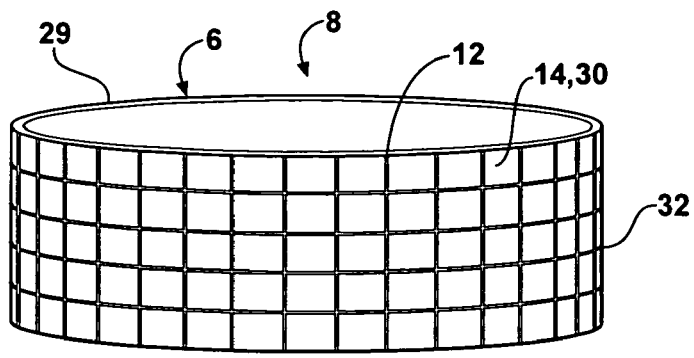
FIG. 10 is a schematic illustration of a cylinder having a bearing surface made in accordance with the method of the present invention.

Referring to FIG. 5A, the step of fabricating 200 a bearing member 8 of a first material having a bearing surface 12 is illustrated. As described herein, bearing member 8 may include any of a number of known sliding bearing members 8, such as a thrust washer 10 (FIGS. 1-4), a piston or cylinder 29 (see FIGS. 8, 10 and 11) and a sleeve bearing 28 (see FIG. 9). The first material may be any of the suitable bearing materials described herein. The step of fabricating 200 may be performed by employing any of a number known fabrication methods described herein, depending on the first material selected for bearing 8. Examples include casting forging, sintering, molding, including injection molding and others. The step of fabricating 200, may also include secondary finishing operations, particularly to prepare the bearing surface 12, or surfaces 12 in the case where the bearing may have multiple bearing surfaces (e.g., in the case of a piston as described herein), such as machining, grinding, deflashing and other well-known finishing operations.

FIG. 5 shows one process that can realize the engineered surfaces at low cost. First step is to apply micro ECM for surface grooving. The cathode will be patterned to control the electrical field. The second step is to apply a thin layer of gel on the top surface but not in the grooves or cavities. This can be done by dipping or rolling. The surface tension of the polymer is controlled to keep the gel out of the cavities. The third step is to coat electrically the surface with pad materials, such as ceramic, chrome, or PTFE, etc. Several coating processes can be used for this purpose. They include electrostatic coating, electrophoretic deposition, electroplating, and electro-plasma plating. The most suitable process will be selected for the given pad material. Since all these electrical processes can only deposit materials on conductive surfaces, the pad material fills only the cavities and builds up on the foundations. After the deposition, sintering is carried out for the ceramics but not for the hard metals. Additional heating step is needed for PTFE. Heating or dissolution can remove the gel or other sacrificial barrier on the surface.

FIG. 6 shows an alternative process for higher feature definition. The first step is to apply photoresist image on the part surface. This lithography procedure includes photoresist application, UV exposure, and resist development. The second step is to make cavities by ECM through the photoresist mask. The third step is to deposit electrically the pad materials into the cavities and to build up the pads. The fourth step is to strip the photoresist off the surface. The last step is to sinter the ceramics unless the deposited material is metal or to cure the PTFE.

These processes, especially ECM, are highly productive and cost effective. ECM can put all the cavities on part surface in just several seconds. Some of the coating processes are also fast, e.g., electrophoretic deposition. ECM is the key step.

Figure 12:
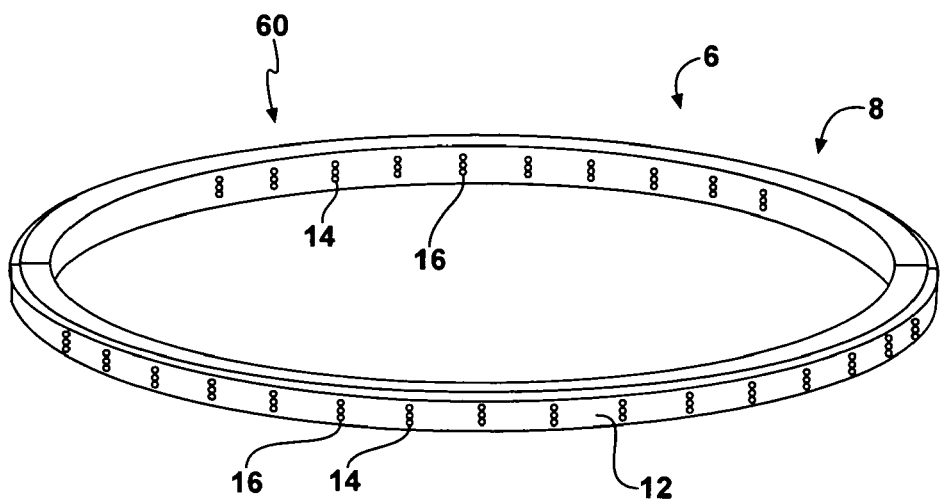
FIG. 12 is a perspective view of a piston ring having surface features according to another embodiment of the invention.

FIG. 12 shows another embodiment of the invention. In FIG. 12, a bearing element 6 of a sliding bearing 8 in the form of a piston ring 60 having a bearing surface 12 which includes a plurality of bearing surface features 14 in the form of cylindrical pads 16. These features 14 are located within a plurality of correspondingly shaped cavities 17 (best shown in FIG. 5) or recesses located on bearing surface 12 and which together comprise a portion of bearing surface 12. The features 14 can be applied on OD or ID surface or both.

Obviously, many modifications and variations of the present invention are possible in light of the above teachings. It is, therefore, to be understood that within the scope of the appended claims, the invention may be practiced otherwise than as specifically described.

What is claimed is:

1. A method of making a sliding bearing, comprising:
    fabricating a bearing member of a first material having a bearing surface;
    forming a plurality of cavities in the bearing surface such that a portion of the bearing surface corresponds to the cavities;
    depositing a layer of a fluid polymer over the bearing surface such that the layer of the fluid polymer covers substantially all of the bearing surface except for the portion of the bearing surface corresponding to the plurality of cavities;
    depositing a second material into the cavities to form a corresponding plurality of bearing surface features in the cavities; and
    removing the fluid polymer from the bearing surface.

2. The method of claim 1, wherein the step of forming comprises electrochemical machining of the plurality of cavities.

3. The method of claim 1, wherein the step of depositing the fluid polymer comprises one of screen printing and roll printing of the fluid polymer.

4. The method of claim 1, wherein the step of depositing the second material comprises using one of electroless plating, electroplating and electrophoresis.

5. The method of claim 1, further comprising a step of sintering the second material.

6. The method of claim 1, further comprising a step of sintering the second material.

7. The method of claim 1, further comprising a step of depositing a layer of an adhesion promoter into the plurality of cavities before the step of depositing the second material into the cavities.

8. The method of claim 1, wherein the bearing surface comprises an electrically conductive material as the first material.

9. The method of claim 8, wherein the electrically conductive material is a metal.

10. The method of claim 9, wherein the metal is selected from a group consisting of iron-based alloys, copper- based alloys and aluminum-based alloys.

11. The method of claim 1, wherein the fluid polymer is one of a liquid polymer or a gel polymer.

12. The method of claim 1, wherein the second material is selected from a group consisting of a metal, an engineering plastic and a ceramic.

13. A method of making a sliding bearing, comprising:
    fabricating a bearing member of a first material having a bearing surface; forming a plurality of cavities in the bearing surface such that a portion of the bearing surface corresponds to the cavities;
    depositing a layer of a photosensitive polymer over the bearing surface; exposing the photosensitive polymer over the bearing surface such that the portion of the bearing surface corresponding to the cavities is preferentially predisposed for removal; removing the photosensitive polymer from the portions of the bearing surface corresponding to the plurality of cavities; and
    depositing a second material into the cavities to form a corresponding plurality of bearing surface features in the cavities.

14. The method of claim 13, wherein the step of forming comprises electrochemical machining of the plurality of cavities.

15. The method of claim 13, wherein the step of depositing the photosensitive polymer comprises one of spin coating, spray coating, dip coating, roll coating, transfer coating and screen printing of the layer of the photosensitive polymer over the bearing surface.

16. The method of claim 13, wherein the step of depositing the second material comprises using one of electroless plating, electroplating and electrophoresis.

17. The method of claim 13, further comprising a step of removing the photosensitive polymer from the bearing surface.

18. The method of claim 17, further comprising a step of sintering the second material.

19. The method of claim 13, further comprising a step of sintering the second material.

20. The method of claim 13, further comprising a step of depositing a layer of an adhesion promoter into the plurality of cavities before the step of depositing the second material into the cavities.

21. The method of claim 13, wherein the bearing surface comprises an electrically conductive material as the first material.

22. The method of claim 21, wherein the electrically conductive material is a metal.

23. The method of claim 22, wherein the metal is selected from a group consisting of iron-based alloys, copper-based alloys and aluminum-based alloys.

24. The method of claim 13, wherein the photo sensitive polymer is one of a positive photoresist or a negative photoresist.

25. The method of claim 13, wherein the second material is selected from a group consisting of a metal, an engineering plastic and a ceramic.

* * * * *